United States Patent
Horvitz et al.

(10) Patent No.: US 6,657,643 B1
(45) Date of Patent: *Dec. 2, 2003

(54) MODULATING THE BEHAVIOR OF AN ANIMATED CHARACTER TO REFLECT BELIEFS INFERRED ABOUT A USER'S DESIRE FOR AUTOMATED SERVICES

(75) Inventors: Eric Horvitz, Kirkland, WA (US); Andrew W. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/312,996

(22) Filed: May 17, 1999

Related U.S. Application Data (63) Continuation-in-part of application No. 09/295,146, filed on Apr. 20, 1999, now Pat. No. 6,505,167.

(51) Int. Cl.$^7$ .................................. G06F 3/14
(52) U.S. Cl. .................... 345/764; 345/781; 345/751; 345/709; 345/745
(58) Field of Search ................ 705/8, 9; 345/781, 345/764, 751, 709, 708, 706, 745, 747; 709/202; 706/45, 46, 47, 48, 52

(56) References Cited

U.S. PATENT DOCUMENTS

| | | | |
|---|---|---|---|
| 5,621,903 A | * 4/1997 | Luciw et al. | 395/326 |
| 5,758,029 A | * 5/1998 | Hall | 706/46 |
| 5,864,848 A | 1/1999 | Horvitz et al. | 707/6 |
| 5,930,700 A | * 7/1999 | Pepper et al. | 455/414 |
| 5,953,393 A | * 9/1999 | Culbreth et al. | 379/88.25 |
| 5,963,913 A | * 10/1999 | Henneuse et al. | 705/9 |
| 6,064,976 A | * 5/2000 | Tolopka | 705/9 |
| 6,094,681 A | * 7/2000 | Shaffer et al. | 709/224 |

OTHER PUBLICATIONS

U.S. patent application Ser. No. 09/055,477, filed Apr. 6, 1998, Method & Apparatus for Buil.
U.S. patent application Ser. No. 08/684,003, filed Jul. 19, 1996, Intelligent User Assistant F.
U.S. patent application Ser. No. 09/197,159, filed Nov. 20, 1998, Intelligent User Assistant F.
U.S. patent application Ser. No. 09/197,158, filed Nov. 20, 1998, Intelligent User Assistant F.
U.S. patent application Ser. No. 09/197,160, filed Nov. 20, 1998, Intelligent User Assistant F.
Judea Pearl, Probabilistic Reasoning in Intelligent Systems: Networks of Plausible Inference (ISBN 1558604790), Apr. 1997.

(List continued on next page.)

*Primary Examiner*—Kristine Kincaid
*Assistant Examiner*—Thomas T. Nguyen
(74) *Attorney, Agent, or Firm*—Amin & Turocy, LLP (57) ABSTRACT

Modulating the behavior of an agent for directing automated services such as for messaging and scheduling is disclosed. In one embodiment, a computer-implemented method inputs an action probability. The action probability has a location within a region corresponding to an option that in one embodiment can be one of: (1) inaction, (2) automatic action, and (3) engaging the user in a dialog about the user's desire for automated action, followed by action pending receipt of user approval. The method then modulates the behavior of the agent depending on the location of the action probability within the region. In one embodiment, the region in which the action probability is located is divided into two or more sub-regions, such that the behavior of the agent is modulated based on which sub-region in which it lies. In another embodiment, a continuous function is imposed onto the region in which the probability is located, where the function yields a confidence level based on the location of the action probability within the region, such that the behavior of the agent is modulated based on this confidence level.

37 Claims, 6 Drawing Sheets

OTHER PUBLICATIONS

Eric Horvitz, Matthew Barry, Display of Information for Time–Critical Decision–Making, Proceedings of the Eleventh Conference on Uncertainty in Artificial Intelligence, Montreal, Aug. 1995.

Eric Horvitz, Jack Breese, David Heckerman, David Hovel, Koos Rommelse, The Lumiere Project: Bayesian User Modeling for Inferring the Goals and Needs of Software Users, Proceedings of the Fourteenth Conference on Uncertainty in Artificial Intelligence, Madison, WI, Jul. 1998, Morgan Kaufmann Publishers, pp. 256–265.

David Heckerman and Eric Horvitz Informational Goals from Free–Text Queries: A Bayesian Approach, Proceedings of the Fourteenth Conference on Uncertainty in Artifical Intelligence, Madison, WI, Jul. 1998, Morgan Kaufmann Publishers, pp. 230–237.

Susan Dumais, John Platt, David Heckerman, Mehran Sahami, Inductive Learning Algorithms and Representations for Text Categorization, Proceedings of ACM–CIKM98, Nov. 1998.

Ben Shneiderman, Pattie Maes, Direct Manipulation vs Interface Agents: Excerpts from debates at IUI 97 and CHI 97, interactions, Nov.–Dec. 1997, pp. 42–61.

M. Sahami, S. Dumais, D. Heckerman, E. Horvitz, A Bayesian Approach to Filtering Junk E–mail, AAAI Workshop on Text Classification, Jul. 1998, Madison, Wisconsin, AAAI Technical Report WS–98–05.

U.S. patent application Ser. No. 09/192,001, filed Nov. 13, 1998, Confidence Measure System . . . .

* cited by examiner

MODULATING THE BEHAVIOR OF AN ANIMATED CHARACTER TO REFLECT BELIEFS INFERRED ABOUT A USER'S DESIRE FOR AUTOMATED SERVICES

RELATED APPLICATIONS

This application is a continuation-in-part of the coassigned application entitled "Systems and Methods for Directing Automated Services for Messaging and Scheduling" Ser. No. 09/295,146, filed on Apr. 20, 1999 now U.S. Pat. No. 6,505,167, which is hereby incorporated by reference.

FIELD OF THE INVENTION

This invention relates generally to automated services such as messaging and scheduling, and more particularly to modulating the behavior of an agent for such automated services.

BACKGROUND OF THE INVENTION

Messaging and scheduling have become important applications in many computer users' lives. Messaging programs generally allow a user to send and receive electronic mail (e.g., messages) to and from other computer users, for example, over a local- or a wide-area network, or over an intranet, extranet, or the Internet. Scheduling programs generally allow a user to track appointments in a calendar. More sophisticated scheduling programs allow one user to schedule a group meeting with other computer users—checking the latter users' schedule availability, and receiving confirmation from the users upon them accepting or rejecting the group meeting appointment.

Within the prior art, however, messaging and scheduling programs are generally not very well integrated, even if they are components within the same computer program. For example, a user may receive a message from a colleague stating "Looking forward to seeing you at 2 on Thursday." Generally, however, the prior art does not provide for automatically directing the scheduling program to make a meeting appointment at 2 p.m. on Thursday. Instead, typically the user who has received the message has to open the scheduling program, access Thursday's calendar, and manually enter an appointment at 2 p.m. on Thursday's calendar. Because of the many steps required to go from reading the message within the messaging program to entering the information into the scheduling program, many users choose not to even use scheduling programs, or to only use them sparingly.

One solution to this difficulty is described in the parent application to the present application, entitled "Systems and Methods for Directing Automated Services for Messaging and Scheduling." In this application, a scheduling probability, which can be generalized to be referred to as an action probability, is determined based on the text of a message (e.g., of an electronic e-mail), and also potentially contextual information such as information regarding recent user activity; the scheduling probability in one embodiment is an inferred probability that the user has a goal of scheduling and/or reviewing calendar information. The probability falls within one of the regions: an inaction region; a suggested action with user approval region (also referred to as a dialog region); and an automated action region.

In the first region, the inaction region, the probability is low enough that no automated service is performed. In the last region, the automated action region, the probability is high enough that an automated action is performed. Finally, in the middle region, the dialog region, the probability is such that the user is approached with a suggested action, which if approved by the user, is then performed in an automated manner. Threshold boundaries separate the first and the middle regions, and the middle and the last regions. The threshold boundaries may be user set, or may be calculated in accordance with decision theory as described in the parent application to the present application.

In one embodiment, an animated graphical and talking agent is utilized to provide a an anthropomorphic interface for the automated action direction process. For example, in the case of the probability lying in the middle region, an agent may appear on the screen and engage the user in a dialog as to whether the user wishes to have the suggested action be automatically performed. In one embodiment, speech recognition is used for the user to provide either an affirmative or a negative answer. As another example, in the case of the probability lying in the last region, an agent may appear on the screen to indicate to the user that an action will soon be performed. The use of an animated graphical and talking agent thus provides a more social interface to communicate with the user regarding automated actions.

The present application provides for a more sophisticated animated graphical and talking agent for use in the automated action direction process, by modulating the social behavior of the agent more closely in regard to the probability inferred automatically about a user's goals.

SUMMARY OF THE INVENTION

The invention relates to modulating the behavior of an agent for directing automated services such as for messaging and scheduling. In one embodiment, a computer-implemented method inputs an action probability, such as a scheduling probability as referred to in the parent application to the current application. The action probability has a location within a region corresponding to an option which in one embodiment can be one of: (1) inaction, (2) automatic action, and (3) engaging the user in a dialog about the user's desire for automated action, followed by action pending receipt of user approval. In one embodiment of the invention, the action probability is generally defined as the inferred probability that a user desires a service. Next, the method modulates the behavior of an automated assistant, also referred to as an agent, depending on the location of the action probability within the region. For example, in one embodiment, the region in which the action probability is located is divided into two or more sub-regions, such that the behavior of the assistant is modulated based on the sub-region in which it lies. As another example, in one embodiment, a continuous function is imposed onto the region in which the probability is located, where the function yields a confidence level based on the location of the action probability within the region, such that the behavior of the agent is modulated based on this confidence level.

Embodiments of the invention provide for advantages not found within the prior art. The agent behaves more naturally, in accordance with the manner by which a human assistant might act to share his or her confidence with the recipient of the assistance, about his or her confidence in the need for assistance—showing appropriate courtesy, humility, tentativeness, etc., for example, when confidence is low. For example, the region in which the action probability is located may be the dialog region, such that the region is divided into two sub-regions, a low-confidence sub-region and a high-confidence sub-region. If the action probability lies in the low-confidence sub-region, then the agent may be more deferential to the user, asking "I was just thinking that you might like me to create an appointment in your calendar based on the e-mail you're reading?". A corresponding animation may be invoked during the utterance that expresses tentativeness in a natural manner, such as the raising of eyebrows, leaning forward with a slightly cocked head, and opening the hands to the user. Conversely, if the action probability lies in the high-confidence sub-region, then the agent may be more direct with the user, stating and then asking "I'd be happy to create an appointment for you based on the e-mail you're reading. Should I go ahead and schedule it?". A corresponding animation might include a more confident, relaxed expression combined with the gesture of the raising of one arm, and pointing the index finger of the associated hand upward to express in a natural manner the agent's more confident reflection about the value of assisting the user. Furthermore, in other embodiments of the invention, modulating the prosody, energy, and pause structure of the speech of the animation can also be modified, as can be appreciated by those of ordinary skill within the art.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
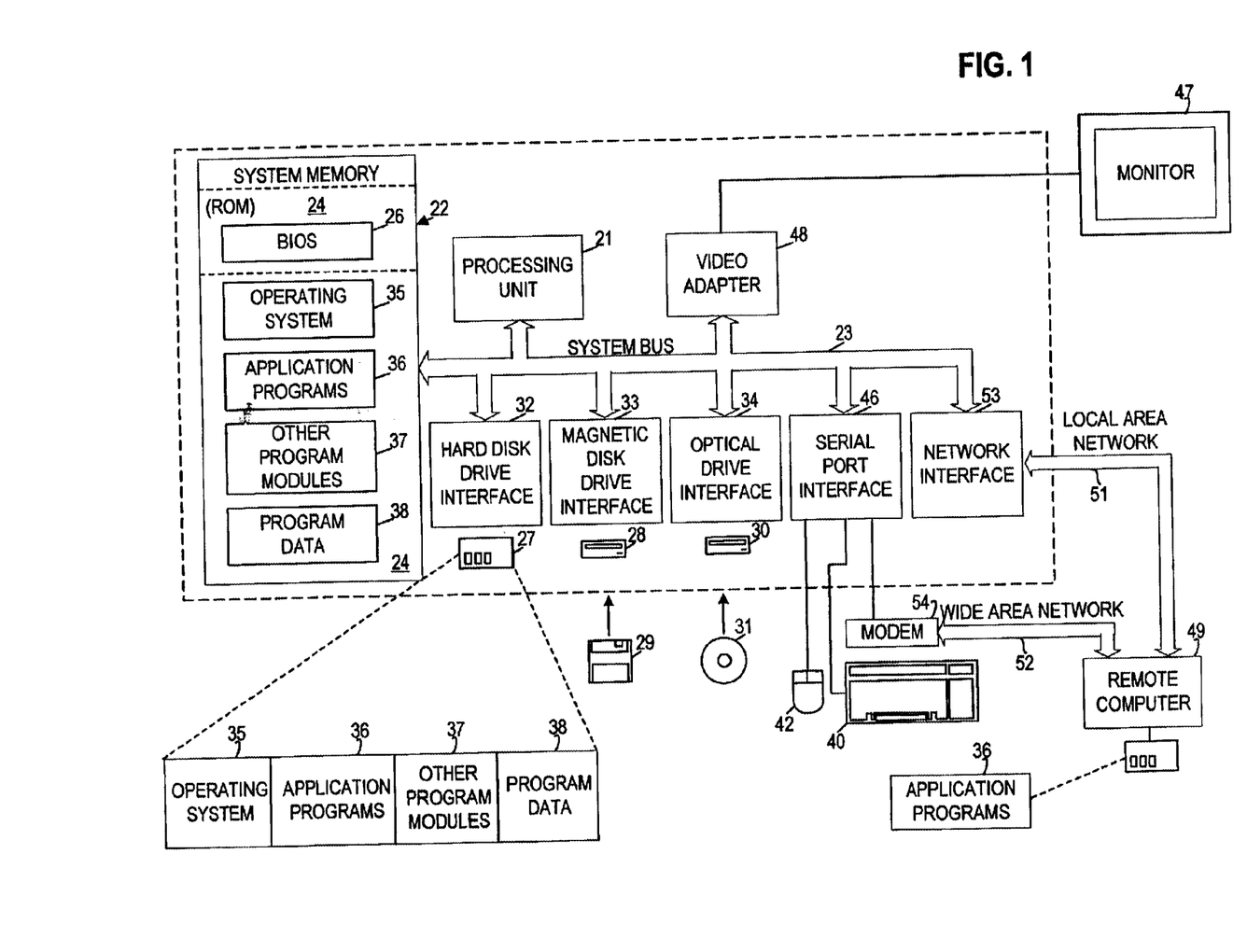
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Illustrative Example

Figure 2:
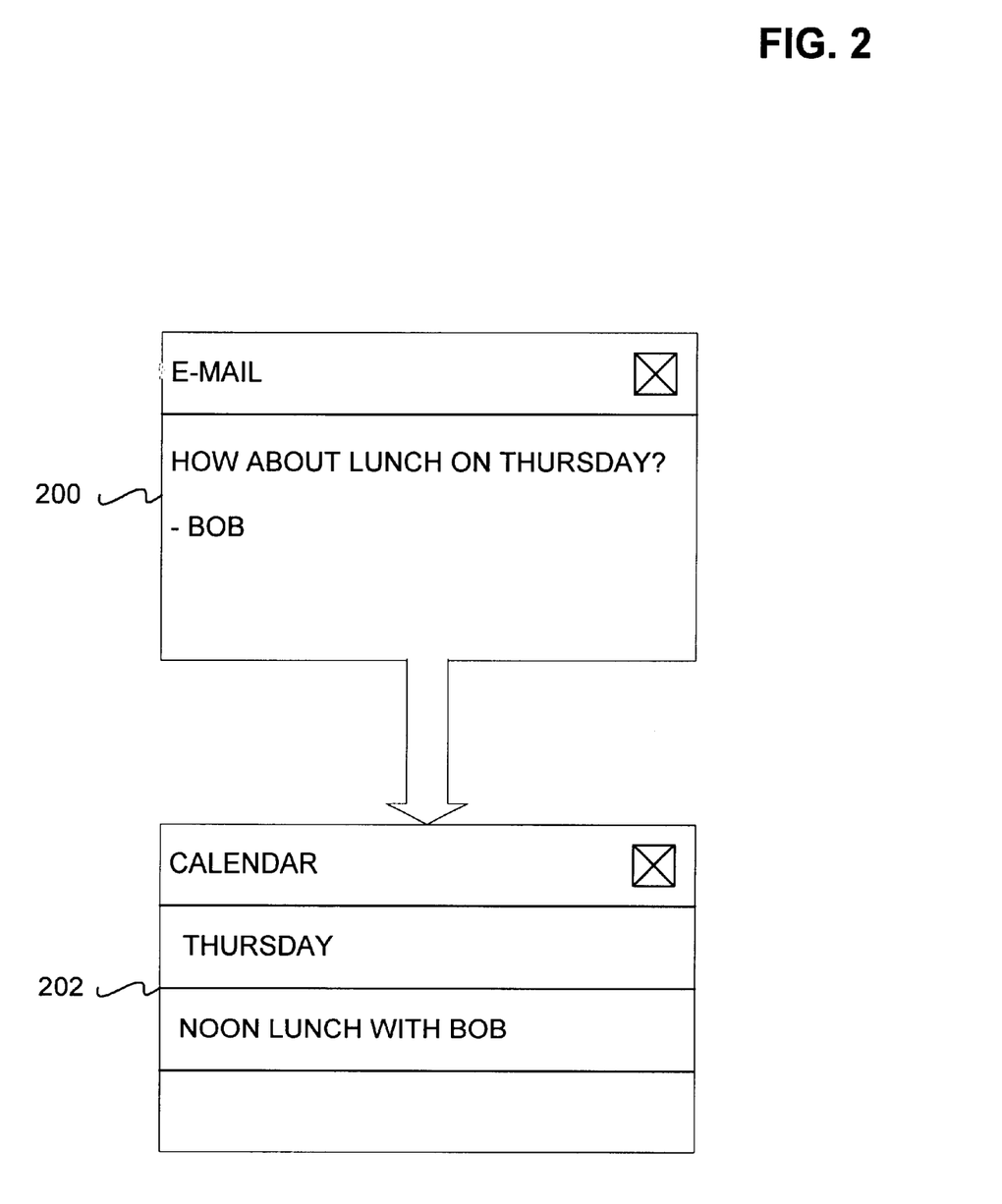
FIG. 2 is a diagram of an example of directed scheduling, such as can be implemented in conjunction with the parent application of the current application.

Prior to describing methods and systems of embodiments of the invention, an illustrative example as to what is meant by automated services is first described, in specific context of the application of electronic mail and calendaring applications. In the example of FIG. 2, an electronic mail is shown in a window 200. The window 200 may be part of an electronic mail program, such as those available within the art. The electronic mail has the text, from a user named Bob, reading "How about lunch on Thursday?". A window 202 of the scheduling program appears, such as scheduling programs available within the art. The automated service causes a scheduling entry to be entered in the user's calendar for Thursday, at noon with a duration of an hour and a half, reading "Lunch with Bob."

In other words, based on the scheduling probability of the electronic mail in the window 200, a decision is made for automatic scheduling based on the probability of the message, as described in the parent application to the current application. A scheduling action is then performed. Thus, the automated service process is able to recognize that "Lunch" means about noon in time, and that "lunch on Thursday" in general has a high probability that the user has the goal of putting the event described in the email in an online appointment book.

Second Illustrative Example

Figure 3:
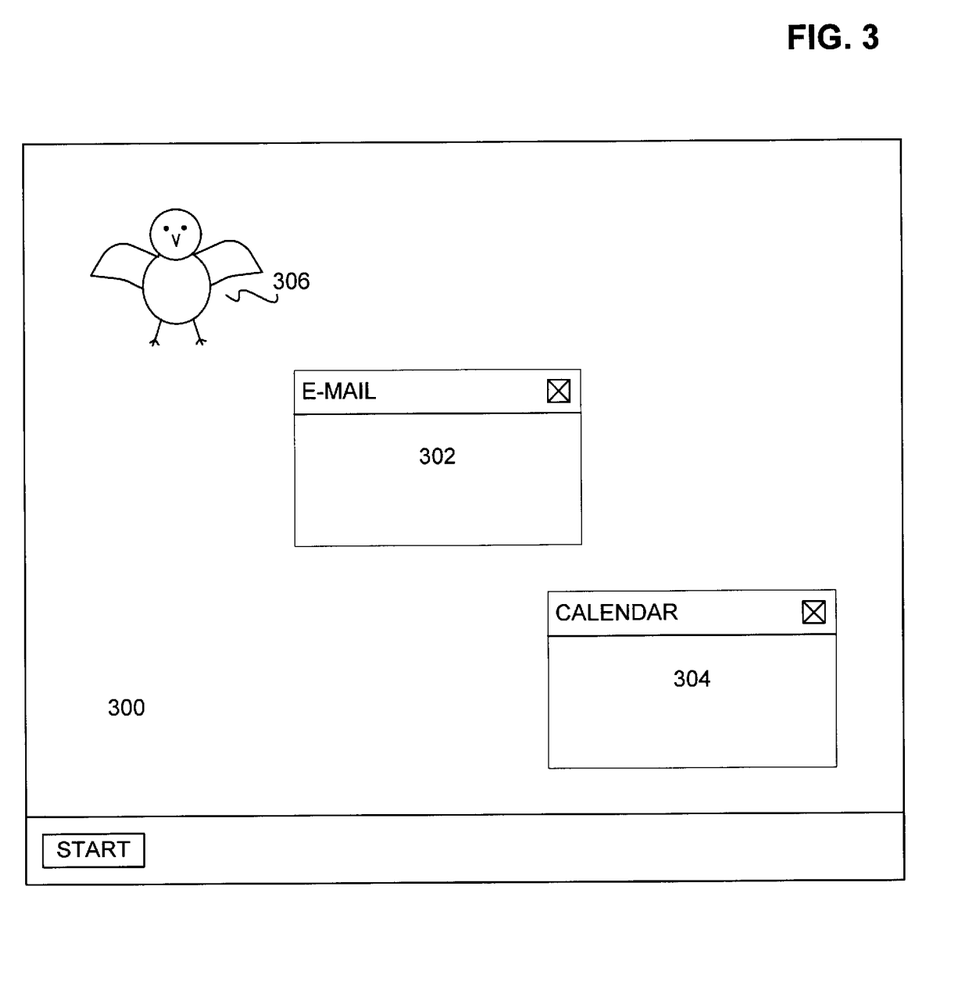
FIG. 3 is a diagram of an example of an agent utilized in the context of directed scheduling, according to an embodiment of the invention.

A second illustrative example is now described, in conjunction with FIG. 3. The example of FIG. 3 shows how an agent can assist in the automated services process. Within the screen 300, there is an animated agent 306, an electronic mail window 302, and a calendar window 304. When the user calls up an e-mail in the window 302, the automated services process determines the probability that the user would like to schedule an appointment in accordance with the text of the e-mail, and based thereon determines, for example, whether to provide an automated service automatically, or to first engage in a dialog with the user regarding a suggested automated service. In the example of FIG. 3, the specific case is a suggested automated service about which a dialog with the user is engaged. Thus, the agent 306, shown in the form of a bird in FIG. 3, is displayed, as well as the calendar window 304. The agent 306 asks the user whether the suggested appointment in the calendar window 304 should be made (not shown in FIG. 3). The user may signal acceptance or declination of the suggested appointment by speaking into a microphone, such that a speech recognition system determines whether the utterance is an acceptance or declination utterance. The agent 306 then performs or does not perform the suggested action as indicated by the user, closes the window 304, and then disappears from the screen 300.

In the context of an embodiment of the invention, the behavior of the agent 306 is modulated based on the probability of the user desiring the scheduling service based on the text of the e-mail in the window 302. For example, as has been stated, in the example of FIG. 3, the specific case is a suggested automated service about which a dialog with the user is engaged. As is apparent from the parent application to the present application, this means that the scheduling probability was not high enough to choose the case of automated service without dialog (i.e., performing the service automatically). The confidence level of automated service, in other words, is not great enough to warrant automated service without dialog. This means that the behavior of the agent 306 is modulated at a general level such that the user is queried, as opposed to the behavior being modulated at a general level such that the automated action is automatically performed.

Furthermore, in accordance with an embodiment of the invention, the behavior of the agent 306 is modulated in an even more refined manner based on the confidence level of the automated service. Rather than only looking at the granularity of dialog versus automatic action, an embodiment of the invention also takes into account the finer granularity of the form of communicating during dialog with the user. That is, after the determination has been made that a dialog with the user should be established, the embodiment determines whether this determination itself was made with low or high confidence. As stated in the summary section, if the action probability is such that a relatively low confidence of the decision to engage the user in a dialog about suggested automated action has been determined, then the agent is more deferential to the user—reflected in its gestures, utterances, etc. For example, the agent may ask the user "I'm guessing that you might find it useful if I put the following appointment in your calendar based on the e-mail you're reading. Should I go ahead and do that for you?". A corresponding animation may be invoked during the utterance that expresses tentativeness in a natural manner, such as the raising of eyebrows, leaning forward while cocking the head to the side slightly, turning one ear to the user, and opening the hands to the user. Conversely, if the action probability is such that a relatively high confidence of the decision to engage the user in a dialog about suggested automated action has been determined, then the agent exudes more confidence and is more direct with the user, again reflected in its gestures, utterances, etc. Thus, the agent may state to and ask the user "I believe that the following appointment in your calendar is appropriated based on the e-mail you're reading. Should I go ahead and schedule it?". A corresponding animation might include a more confident, relaxed expression combined with the gestures of cocking the head forward in a symmetric manner and the placing both hands on the agent's hips.

Those of ordinary skill within the art can appreciate that behavior modulation as described herein encompasses even other behavior options in addition to those specifically recited. For example, the agent may make an apology for bothering the user when the agent hears abnegation from the user, based on the initial inferred probability that the user may have desired the service. The strength of the apology can also be based on the initial inferred probability.

Similarly, the behaviors regarding how the agent reacts to not hearing anything or hearing a negation from the user can also be modified in a predetermined manner. That is, when an acknowledgment is not heard from the user (that is, when an utterance is not heard from the user), or a negation from the user is heard, regarding a query about providing service, an appropriate, natural shrugging of the shoulders of the agent can be displayed to reflect the agent "thinking" "I guess the user's just really busy, because he isn't even answering me." Optionally, the agent may perform one of several gestures to indicate that there has been an unwanted disturbance, and at times coupled with an apology as described in the previous paragraph, such as "sorry, you must be really busy"—or even shared essentially only to the agent itself in a soliloquy whisper of such a system.

The sections of the detailed description that follow describe embodiments of the invention such that this illustrative example can be implemented. Those of ordinary skill within the art can appreciate, however, that the illustrative example presented in this section is not meant to limit embodiments of the invention, but rather has been presented for purposes of understanding embodiments of the invention. The embodiments of the invention that are hereinafter described thus can be used in automated services contexts other than messaging and scheduling.

Modulating Agent Behavior Based on Action Probability

In this section of the detailed description, embodiments of the invention are described that provide for modulated agent behavior based on action probability. The action probability in one embodiment is defined as an inferred probability that the user has a goal of the automated service, such as scheduling a calendaring appointment. The action probability can in one embodiment be based on a text, such as an electronic mail message, as well as on contextual information, such as recent user activity. In one embodiment, the action probability is determined as described in the parent application to the current application.

Figure 4:
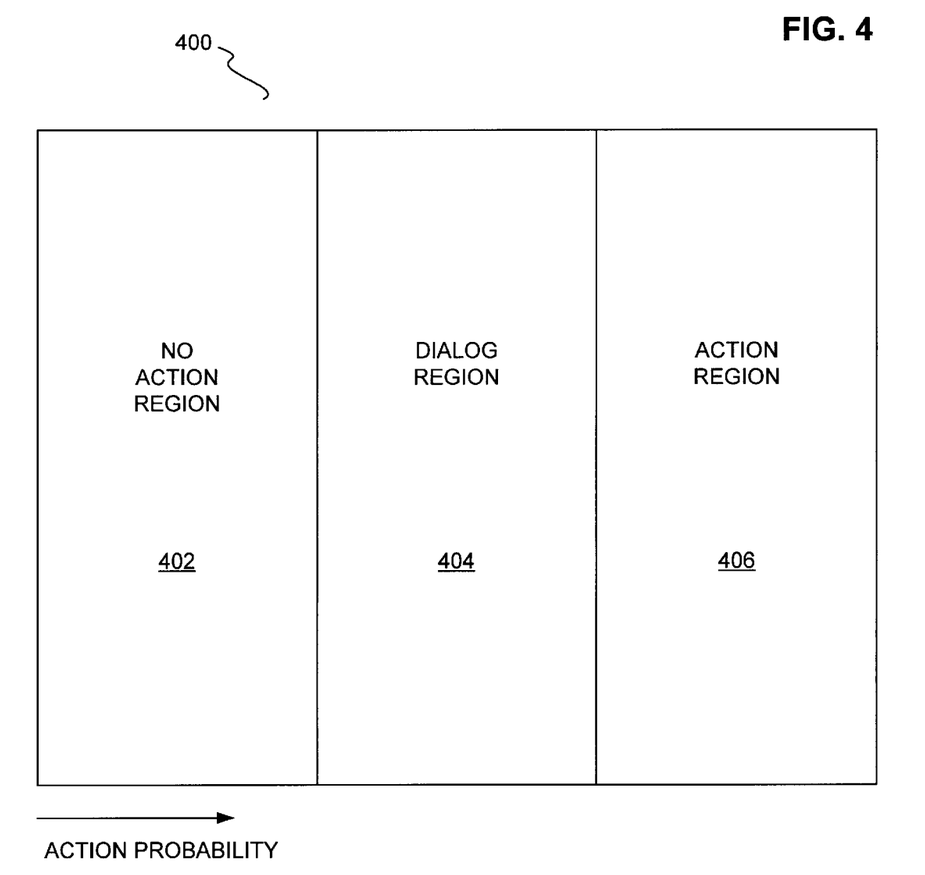
FIG. 4 is a diagram of three regions in which an action probability can be located, according to one embodiment of the invention.

Referring next to FIG. 4, a diagram of three regions in which an action probability can be located, according to one embodiment of the invention, is shown. The graph 400 can correspond to the graphs of FIG. 7 and FIG. 8 of the parent application to the current application. In one embodiment, the action probability has a location within a region of the graph 400 corresponding to an option selected from the group essentially consisting of: (1) no action, (2) automatic action, and (3) engaging the user in a dialog about the user's desire for automated action, followed by action pending receipt of user approval. That is, in one embodiment, the action probability has a location within either a no-action region 402, a dialog region 404, or an action region 406.

Thus, once the action probability has been determined, it is mapped against the graph 400 to determine in which of the regions 402, 404 and 406 it is located. As shown in FIG. 4, the action probability increases from left to right in the graph 400. Therefore, if the action probability is low, then it falls within the no-action region 402; if it is higher, it falls within the dialog region 404, and if it is higher still, it falls within the action region 406. As stated in the parent application to the current application, the boundaries between the regions 402 and 404, and between the regions 404 and 406, can be user defined, or set in accordance with decision theory. Thus, as action probability increases, the type of action with which the automated assistant (also referred to as an agent) responds goes from no action, to suggested action with user approval (dialog), to automatic action without dialog.

The invention provides for modulating the behavior of the agent—that is, the displayed gestures, postures, utterances, etc., of the agent—based on the location of the action probability within a region. That is, in addition to the behavior of the agent changing depending on whether the action probability is within the no-action region 402, versus the dialog region 404, versus the action region 406, the invention provides for modulating the behavior of the agent depending on the location of the action probability within a given region. In one embodiment, the behavior of the agent is specifically modulated based on its location within either the dialog region 404, or the action region 406.

In one embodiment, the modulation of the behavior of the agent is divided into different classes of modulation of behavior: (1) utterances; (2) gestures and postures; and, (3) parameters that describe the variable components of the interaction machinery, such as a speech recognition confidence threshold used to determine when an utterance is understood, given uncertainty in the utterance. For example, the confidence level required for specific responses, such as the threshold required before an utterance is considered to have been confidently heard as "no", " can be changed. Those of ordinary skill within the art can thus appreciate that the description of one embodiment of the invention that follows can also be modified as described in this paragraph—that is, to divide modulation of the behavior of the agent into different classes. Those of ordinary skill within the art can also appreciate, however, that the invention is not so limited.

For example, when the action probability is located in the dialog region 404 of the graph 400, but closer to the no action region 402 than the action region 406, then this means that there is less confidence that dialog should be invoked, as opposed to the situation where the action probability is located closer to the action region 406. As another example, when the action probability is located in the action region 406 of the graph 400, but close to the dialog region 400, then this means also that there is less confidence that automatic action should be invoked. In this latter example, the behavior of the agent may be modulated such that the agent is more responsive to the user indicating disapproval of the automatic action—such that if a speech recognition system hears with 20% probability or greater that the user says "don't do that," for example, the agent quickly backs off, as opposed to if the action probability is further away from the boundary between the action region 406 and the dialog region 400, then the agent may only back off if the speech recognition system hears with 50% probability or greater that the user says "don't do that."

Figure 5:
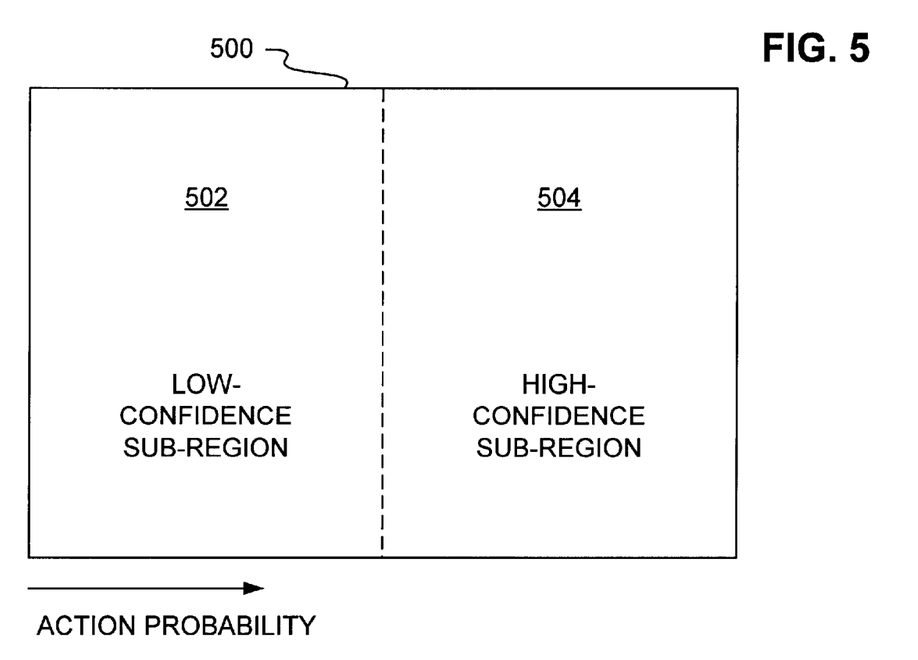
FIG. 5 is a diagram showing the manner by which the behavior of an automated assistant is modulated depending on the location of the action probability within a region, according to one embodiment of the invention.

Referring next to FIG. 5, a diagram showing the manner by which the behavior of an automated assistant is modulated depending on the location of the action probability within a region, such as a dialog region or an action region, according to one embodiment of the invention, is shown. The region 500, for example, can correspond to the dialog region 404 or the action region 406 of FIG. 4. The region 500 is divided into a plurality of sub-regions—in the case of FIG. 5, two sub-regions 502 and 504. The sub-regions are ordered from left to right in increasing confidence levels, such that a first sub-region (e.g., sub-region 502) has a minimum confidence level, and a last sub-region (e.g., sub-region 504) has a maximum confidence level. The action probability falls within one of the sub-regions.

Thus, in the embodiment of FIG. 5, the behavior of the agent is modulated based on which sub-region the action probability is located. If it is located in the sub-region 502, this corresponds to a low-confidence sub-region, such that the behavior of the agent is rendered more deferential in performing the operation of the region 500 (e.g.,.in engaging in a dialog, or in performing an automatic action). Conversely, if the action probability is located in the sub-region 504, this corresponds to a high-confidence sub-region, such that the behavior of the agent is rendered more direct in performing the operation of the region 500. While the diagram of FIG. 5 shows only two sub-regions, it is noted that the invention is not so limited.

Figure 6:
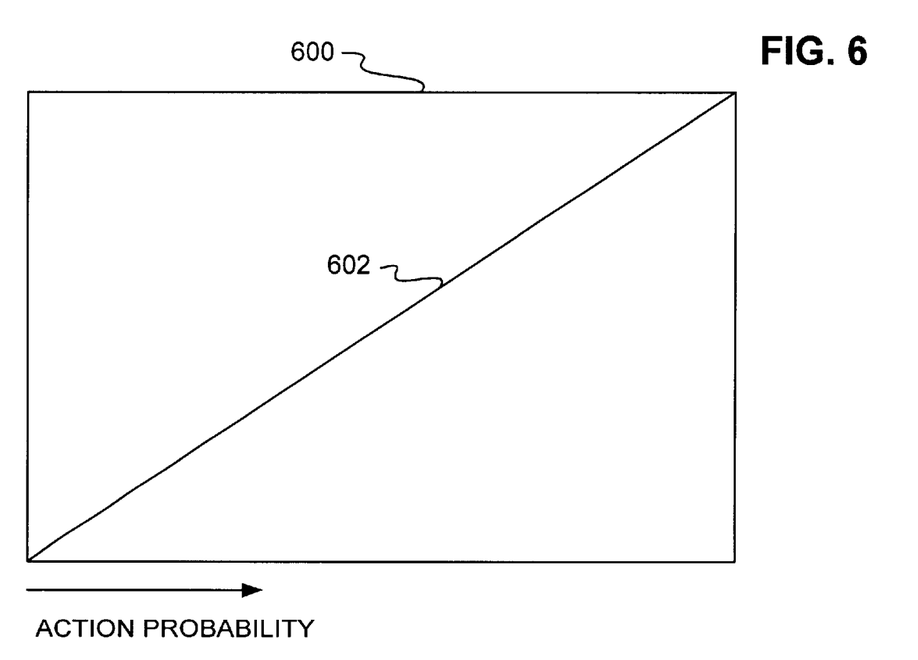
FIG. 6 is a diagram showing the manner by which the behavior of an automated assistant is modulated depending on the location of the action probability within a region, according to another embodiment of the invention; and, FIG. 7 is a flowchart of a method according to one or more embodiments of the invention.

Referring next to FIG. 6, a diagram showing the manner by which the behavior of an automated assistant is modulated depending on the location of the action probability within a region, such as a dialog region or an action region, according another embodiment of the invention, is shown. The region 600 can also correspond to a region of FIG. 4, such as the dialog region 404 or the action region 406. Within the region 600, a continuous function 602 is imposed onto the region, such that the function yields a confidence level based on the location of the action probability within the region. In mathematical terms, confidence level= function(inferred probability that user desires the service within a region).

The invention is not limited to any particular function 602. As shown in FIG. 6, the function 602 is linear. However, the invention is not so limited. That said, in general, the function desirably should be an increasing function, such that function(x+y) is always greater than function(x) for any y greater than or equal to zero. This is because the confidence level generally increases as the action probability is located from left to right within the region 600, as those of ordinary skill within the art can appreciate.

Thus, within the embodiment of FIG. 6, the behavior of the automated assistant is modulated based on the confidence level yielded by the continuous function 602. Those of ordinary skill within the art can appreciate that the embodiment of FIG. 6 can be stated as being the embodiment of FIG. 5 having n sub-regions, where n approaches infinity. Put another way, because the function 602 is continuous function, the embodiment of FIG. 5 can be thought of as having a discrete function.

Methods

In this section of the detailed description, computer-implemented methods according to varying embodiments of the invention are described. The computer-implemented methods are desirably realized at least in part as one or more programs running on a computer (such as the computer of FIG. 1)—that is, as a program executed from a computer-readable medium such as a memory by a processor of a computer. The programs are desirably storable on a machine-readable medium such as a floppy disk or a CD-ROM, for distribution and installation and execution on another computer.

Figure 7:
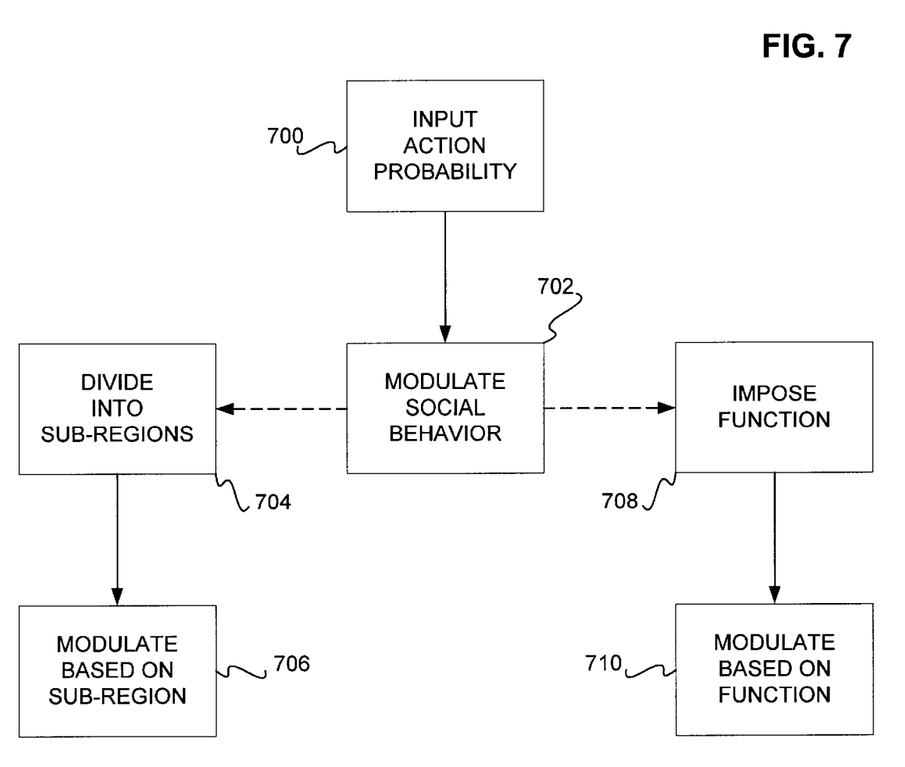

Referring now to FIG. 7, a flowchart of a method according to one or more embodiments of the invention is shown. In 700, an action probability is input, where the action probability has a location within a region. The action probability is determined in one embodiment as described in the parent application to the current application. In one embodiment, the region corresponds to an option selected from the group essentially consisting of (1) inaction, (2) automatic action, and (3) engaging the user in a dialog about the user's desire for automated action, followed by action pending receipt of user approval. The invention is not so limited, however.

In 702, the behavior of an automated assistant, or agent, displayed on the screen is modulated based on the location of the action probability within the region. Such behavior includes: utterances, speech parameters (high pitch, low pitch, etc.), sizing, gestures, and invasiveness (e.g., does the agent display right near the window the user is working in, or farther away, etc.). The invention is not so limited, however. In one embodiment, the behavior is modulated by simulating the agent's behavior based on a plurality of predetermined behaviors. For example, in a case of low confidence, there may be five different behaviors for the agent; simulating the agent's behavior based on these five different behaviors means choosing randomly one or a combination of one or more of these behaviors. Again, the invention is not so limited.

In different embodiments of the invention, the behavior of the agent is modulated in two different manners: one by performance of 704 and 706, and another by performance of 708 and 710. Each manner is described in turn. In 704, the region in which the action probability is located is divided into a plurality of sub-regions, ordered in increasingly confidence levels, such that a first sub-region has a minimum confidence level and a last-sub-region has a maximum confidence level. The action probability is thus located in one of the plurality of sub-regions. In one embodiment, there are two sub-regions, although the invention is not so limited.

Therefore, in 706, the behavior of the agent is modulated based on the sub-region in which the action probability is located. That is, the behavior of the agent is determined consistent with a confidence level of the sub-region in which the action probability is located. A first sub-region, for example, may correspond to a lesser confidence level, such that the behavior is modulated accordingly, while a second sub-region may correspond to a higher confidence level, also such that the behavior of the agent is modulated accordingly.

In the other manner by which the behavior of the agent can be modulated in accordance with an embodiment of the invention, in 708 a continuous function is imposed onto the region in which the action probability is located. The function thus yields a confidence level based on (viz., as a function of) the location of the action probability within the region. The invention is not particularly limited to any type of function. In one embodiment, the function is a linear function. In general, it is desirable to have a function that is an increasing function for any pair f(x), f(y), where x>y and both x and y are located within the region. Furthermore, the function can simply be the probability regardless of region, in one embodiment, and in another embodiment, simply the computed expected utility of the action, as those of ordinary skill within the art can appreciate. Therefore, in 710, the behavior of the automated assistant is modulated based on the confidence level yielded by the continuous function. As has been stated, the continuous functionality can be conceptualized as dividing the region into an infinite number of sub-regions. Thus, the continuous function approach of 708 and 710 provides for greater difference in the modulation of the agent's behavior for any two action probabilities x and y located within the region, as compared to the sub-region approach of 704 and 706. For example, in the sub-region approach of 704 and 706, two action probabilities x and y may be located within the same sub-region such that the behavior of the automated assistant is modulated based on the same resulting confidence level, while in the continuous function approach of 708 and 710, the behavior of the automated assistant is modulated based on differing confidence levels.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:

inputting an action probability, the action probability having a location within a region corresponding to an option selected from the group essentially consisting of: (1) inaction, (2) automatic action, and (3) en-aging the user in a dialog about the user's desire for automated action, followed by action pending receipt of user approval:

dividing the region into a plurality of sub-regions ordered in increasing confidence levels such that a first sub-region has a minimum confidence level and a last sub-region has a maximum confidence level, the location of the action probability falling within one of the sub-regions; and, modulating the behavior of an automated assistant based on the one of the sub-regions in which the location of the action probability falls.

2. The method of claim 1, wherein the behavior of the automated assistant comprises at least one of: utterances, speech parameters, sizing, gestures, and invasiveness.

3. The method of claim 1, wherein the behavior of the automated assistant comprises at least one of: prosody, energy, pause stricture of speech of the automated assistant.

4. The method of claim 1, wherein modulating a behavior of an automated assistant comprises modulating the behavior upon user negation in a predetermined manner.

5. The method of claim 4, wherein modulating the behavior by making an apology.

6. The method of claim 1, wherein modulating a behavior of an automated assistant comprises modulating behavior upon not hearing an utterance from the user.

7. The method of claim 1, wherein modulating a behavior of an automated assistant comprises modulating at least one of a group of classes of behaviors consisting essentially of: (1) utterances: (2) gestures and postures: and, (3) parameters regarding variable components of interaction machinery.

8. The method of claim 1, wherein modulating the behavior of the automated assistant based on the one of the sub-regions in which the location of the action probability falls comprises determining the behavior consistent with a confidence level of the one of the sub-regions in which the location of the action probability falls.

9. The method of claim 1, wherein dividing the region into a plurality of sub-regions comprises dividing the region into two sub-regions comprising the first sub-region having the minimum confidence level and the last sub-region having the maximum confidence level.

10. The method of claim 1, wherein modulating a behavior comprises:

imposing a continuous junction onto the region, the function yielding a confidence level based on the location of the action probability within the region;

modulating the behavior of the automated assistant based on the confidence level yielded by the continuous function.

11. The method of claim 10, wherein the continuous function comprises a linear function.

12. The method of claim 10, wherein the continuous function comprises the action probability itself.

13. The method of claim 10, wherein the continuous function comprises a computed expected utility of action.

14. The method of claim 1, wherein modulating a behavior of an automated assistant depending on the location of the action probability within the region comprises simulating the behavior of the automated assistant from a set of behaviors appropriate to the location of the action probability within the region.

15. A computer-implemented method comprising:
    using a graphical user interface to receive ail action probability having a location within a region;
    dividing the region into a plurality of sub-regions ordered in increasing confidence levels such that a first sub-region has a minimum confidence level and a last sub-region has a maximum confidence level, the location of the action probability falling within one of the sub-regions; and,
    modulating the behavior of the automated assistant based on the one of the sub-regions in which the location of the action probability falls.

16. The method of claim 15, wherein modulating the behavior of the automated assistant based on the one of the sub-regions in which the location of the action probability falls comprises determining the behavior consistent with a confidence level of the one of the sub-regions in which the location of the action probability falls.

17. The method of claim 15, wherein dividing the region into a plurality of sub-regions comprises dividing the region into two sub-regions comprising the first sub-region having the minimum confidence level and the last sub-region having the maximum confidence level.

18. A computer-implemented method comprising:
    using a graphical user interface to receive an action probability having a location within a region;
    imposing a continuous function onto the region, the function yielding a confidence level based on the location of the action probability within the region; and,
    dividing the region into a plurality of sub-regions ordered in increasing confidence levels such that a first sub-region has a minimum confidence level and a last sub-region has a maximum confidence level the location of the action probability falling within one of the sub-regions: and,
    modulating the behavior of the automated assistant based on the confidence level yielded by the continuous function.

19. The method of claim 18, wherein the continuous function comprises a linear function.

20. A machine readable medium having instructions stored thereon for execution by a processor to perform a method comprising:
    inputting an action probability, the action probability having a location within a region corresponding to an option selected from the group essentially consisting of: (1) inactions, (2) automatic action, and (3) engaging the user in a dialog about the user's desire for automated action, followed by action pending receipt of user approval:
    dividing the region into a plurality of sub-regions ordered in increasing confidence levels such that a first sub-region has a minimum confidence level and a last sub-region has a maximum confidence level, the location of the action probability falling within one of the sub-regions; and,
    modulating the behavior of an automated assistant based on the one of tie sub-regions in which tile location of the action probability falls.

21. The medium of claim 20, wherein the behavior of the automated assistant comprises at least one of: utterances, speech parameters, sizing, gestures, and invasiveness.

22. The medium of claim 20, wherein the behavior of the automated assistant comprises at least one of: prosody, energy, pause structure of speech of the automated assistant.

23. The medium of claim 20, wherein the modulating a behavior of an automated assistant comprises modulating the behavior upon user navigation in a predetermined manner.

24. The medium of claim 23, wherein modulating the behavior by making an apology.

25. The medium of claim 20, wherein modulating a behavior of an automated assistant comprises modulating behavior upon not hearing an utterance from the user.

26. The medium of claim 20, wherein modulating a behavior of an automated assistant comprises modulating at least one of a group of classes of behaviors consisting essentially of: (1) utterances; (2) gestures and postures: and, (3) parameters regarding variable components of interaction machinery.

27. The medium of claim 20, wherein modulating a behavior of an automated assistant depending on the location of the action probability within the region comprises simulating the behavior of the automated assistant from a set of behaviors appropriate to the location of the action probability within the region.

28. A machine-readable medium having instructions stored thereon for execution by a processor to perform a method comprising:
    inputting an action probability having a location within a region;
    dividing the region into a plurality of sub-regions ordered in increasing confidence levels such that a first sub-region has minimum confidence level and a last sub-region has a maximum confidence level, the location of the action probability falling within one of the sub-regions; and,
    modulating the behavior of the automated assistant based on the one of die sub-regions in which the location of the action probability falls.

29. The medium of claim 28, wherein modulating the behavior of the automated assistant based on the one of the sub-regions in which the location of the action probability falls comprises determining the behavior consistent pith a confidence level of the one of the sub-regions in which the location of the action probability falls.

30. The medium of claim 28, wherein dividing the region into a plurality of sub-regions comprises dividing the region into two sub-regions comprising the first sub-region having the minimum confidence level and the last sub-region having the maximum confidence level.

31. A machine-readable medium having instructions stored thereon for execution by a processor to perform a method comprising:
    inputting an action probability having a location within a region;
    imposing a continuous function onto the region, the function yielding a confidence level based on the location of the action probability within the region;

dividing the region into a plurality of sub-regions ordered in increasing confidence levels such that a first sub-region has a minimum confidence level and a last sub-region has a maximum confidence level, the location of the action probability falling within one of the sub-regions; and, modulating the behavior of an automated assistant based on the one of the sub-regions in which the location of the action probability falls.

32. The medium of claim 31, wherein the continuous function comprises a linear function.

33. The medium of claim 31, wherein the continuous function comprises the action probability itself.

34. The method of claim 31, wherein the continuous function comprises a computed expected utility of action.

35. A computer-implemented method comprising:

determining a message to analyze;

determining a probability that the message should be scheduled based al least in part on the message and contextual information;

providing a selection option of at least one of: (1) inaction, (2) automatic action, and (3) suggested action with user approval; and performing a scheduling action based at least in part on the scheduling probability and a selected option.

36. A machine-readable medium having processor instructions stored thereon for execution by a processor to cause performance of a method comprising:

determining a message to analyze;

determining a probability that the message should be scheduled;

providing a selection option of at least one of: (1) inaction, (2) automatic action, and (3)

performing a scheduling action based at least in part on the scheduling probability and a selected option.

37. A computerized system comprising:

a scheduling program in which a user is able to track appointments within a calendar; and, a scheduling direction program to determine a probability that a message should be scheduled based in part on the message and an input; the input enabling an option selected from at least one of: (1) inaction, (2) automatic action, and (3) suggested action with user approval; the scheduling direction program perform a scheduling action within the scheduling program based at least in part on the scheduling probability and the input.

* * * * *